Jan. 3, 1928.
J. A. STEVENS
SHOCK ABSORBER
Filed Aug. 13, 1925
1,655,201
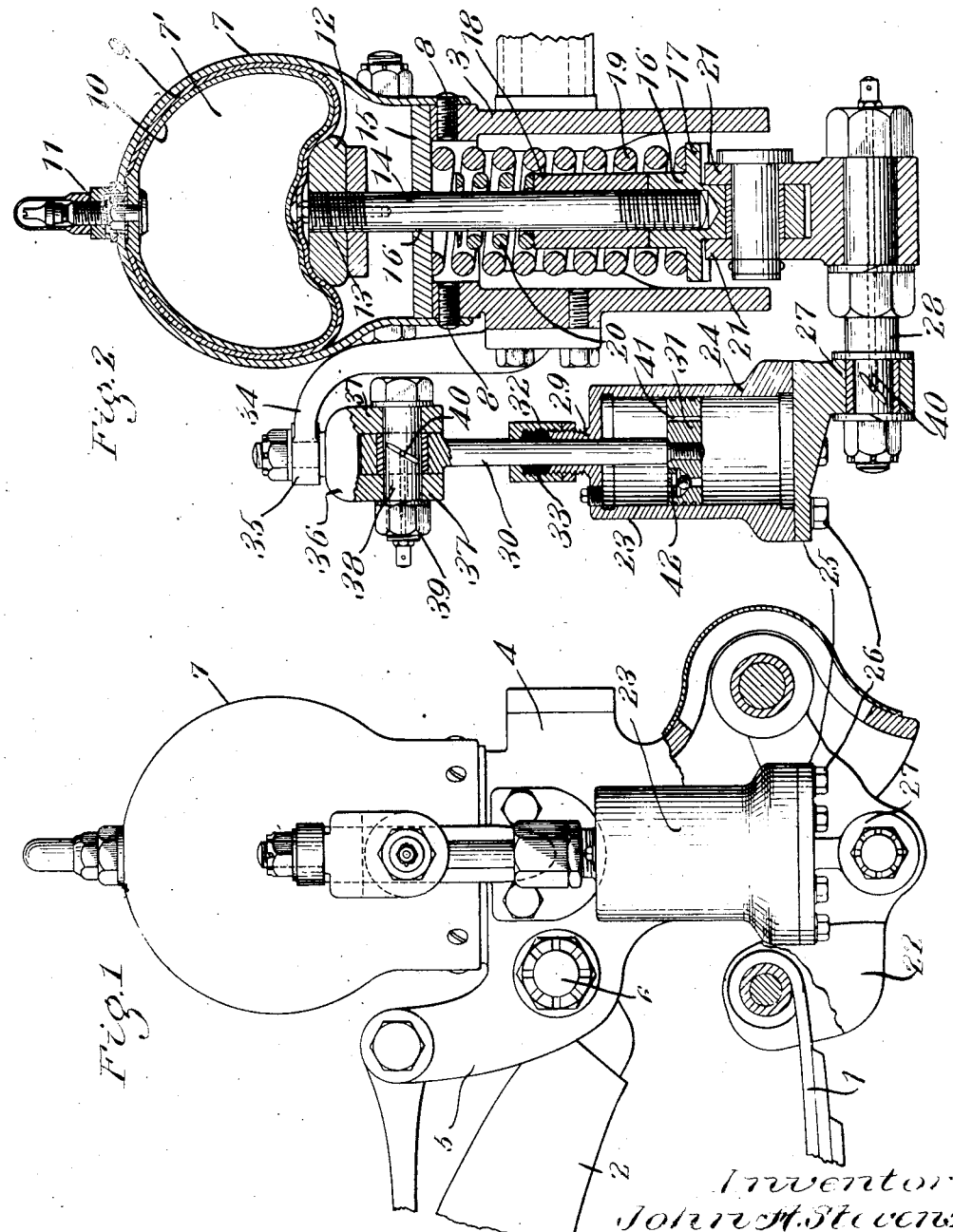

Patented Jan. 3, 1928.

1,655,201

UNITED STATES PATENT OFFICE.

JOHN A. STEVENS, OF LOWELL, MASSACHUSETTS, ASSIGNOR TO STEVENS PRODUCTS CO., OF LOWELL, MASSACHUSETTS, A CORPORATION OF DELAWARE.

SHOCK ABSORBER.

Application filed August 13, 1925. Serial No. 50,022.

This invention relates to an improvement in shock absorbers for use in conjunction with and supplementing the usual body springs of a vehicle.

The outstanding defect in known shock absorbers prior to this invention has been their inability to overcome the undulating movement characteristic of an automobile when traveling at the higher rates of speed. Even the best highways contain ripples on their surface that cause an automobile to sway and oscillate transmitting to the occupants of the vehicle a rising and falling movement that is a source of great annoyance and oftentimes a cause of illness. Present day shock absorbers that are sufficiently responsive and resilient to neutralize shocks do not react to quickly arrest the relative movement between the chassis and springs of the vehicle but on the contrary actually augment the undulating tendency of the vehicle.

Objects of this invention are to provide a shock absorber readily responsive to all shocks and able to counteract and neutralize them effectively and at the same time adapted to bring the forces acting on the springs and chassis of the vehicle into equilibrium without affecting the resiliency of the springs and ability of the device to neutralize shocks; to provide a dash-pot in a shock absorbing device so that the normal position of the chassis of the vehicle relative to the springs and wheels under a normal load is effectively maintained; and to provide a device so simple in its construction that it can be easily applied to an automobile or other vehicle without changing any parts.

Other objects of the invention will be apparent from the detailed description and the claims appended thereto.

For purposes of illustration the device is shown in the accompanying drawings in which Fig. 1 is a side elevation of the device attached to the chassis and springs of a vehicle; and Fig. 2 is a vertical sectional view of the device at right angles to the view shown in Fig. 1.

As illustrated the numeral 1 designates the usual semi-elliptic leaf spring attached to the axle of a vehicle while the numeral 2 designates the chassis or frame carried by said spring. A shock absorbing device designated as a whole by the numeral 3 is adapted to be mounted between adjacent ends of the spring 1 and the chassis 2.

The shock absorbing device 3 comprises a body portion 4 having a projecting arm 5 carrying a spindle 6 which pivotally receives the end of the frame or chassis 2 so that freedom of movement is permitted between said chassis and device. The upper end of the body portion 4 receives a hollow spherical casing 7 forming a compression chamber 7' rigidly held in place on said body portion by a series of screws 8. A pneumatic fabric casing 9 containing an inner rubber casing 10 is mounted within the hollow spherical member 7 and is adapted to be inflated through a valve 11 extending through the upper portion of said spherical member 7, outer casing 9 and inner casing 10. The valve 11 may be of the type commonly employed for inflating pneumatic casings. The pneumatic casing may be inflated to contain air at varying pressure depending on the weight of the vehicle so as to make the shock absorbing device sufficiently responsive to counteract and neutralize all shocks received by the vehicle.

A plunger 12 threaded on the reduced threaded end 13 of the plunger rod 14 engages the underside of the casing 9 and further compresses the air within said compression chamber on an upward movement thereof. An annular washer 15 having an opening 16 receiving the plunger rod 14 is mounted on top of the body portion 4 within the lower end of the spherical casing 7 and is adapted to center the plunger 12 and rod 14 relatively to the casing 9.

A tubular sleeve 16 having an exterior annular projection forming a shoulder 17 is in threaded engagement with the lower threaded end of the plunger rod 14. A relatively large coil spring 19 surrounds the plunger rod 14 and sleeve 16 and is mounted between the shoulder 17 and the washer 15. Within the large coil spring 19 is a smaller coil spring 20 seated on the shoulder 18 of the sleeve 16 and surrounding the rod 14. Spring 20 functions only when the large coil 19 has been sufficiently compressed to compress the smaller spring 20 between the shoulder 18 on which it is seated and the washer 15.

The lower end of the sleeve 16 projects downwardly from the lower end of the plunger rod 14 and is pivotally received in lugs 21 integral with an arm 22 intermediate the end of said arm. One end of said arm 22 is pivotally attached to the body portion 4 while the opposite end of said arm pivotally receives the projecting end of the spring 1 so that free movement between the leaf spring 1, arm 22 and body portion 4 is permitted.

A dash-pot designated as a whole by the reference numeral 23 is pivoted to the arm 22 immediately below the point where the sleeve 16 is pivoted to said arm. The dash-pot 23 comprises a cylinder 24 having a lower cover 25 secured thereto through the medium of the bolts 26. The cover 25 has a depending lug 27 which receives a spindle 28 pivotally attached to the arm 22. The upper end of the cylinder 24 has an upstanding externally threaded tubular projection 29 which acts as a bearing for the piston rod 30 carrying a piston 31 on its lower end. An internally threaded retaining nut 32 containing packing 33 is in screw-threaded engagement with the bearing 29 and serves to prevent any loss of compression in the cylinder between the piston rod and bearing. An upstanding arm 34 is rigidly attached at one end to a side of the body portion 4 while its other end is in the form of an eye 35 receiving the projecting end of a member 36 having lugs 37 which receive the upper end of the piston rod 30. A bolt 38 having a nut 39 projects through the lugs 37 and piston rod 30 to secure said members together. Suitable oiling grooves 40 are provided in the bolt 38 and spindle 28 as shown in Fig. 2.

The piston 31 has a narrow opening 41 extending therethrough between its center and its peripheral edge and a one way valve 42 spaced from the opening 41. When the piston 31 moves downwardly relatively to the cylinder 24 the valve will raise when the pressure of the fluid below the piston becomes sufficient and thus allow the pressure above and below the piston to become substantially equal but when the piston moves upwardly relatively to the cylinder the valve will always remain in closed position.

The operation of the device is as follows: When a shock is transmitted to the spring 1 the force of said shock is not directly carried to the frame 2 but causes the plunger 12 to rise upwardly against the pressure of the compressed air in the compression chamber 7' so that the shock is counteracted and neutralized and very slightly conveyed to the occupants of the vehicle as is well known and understood. The dash-pot 23 not only serves to impede and soften the shock transmitted to the frame 2 but when the forces acting on the vehicle are such as to tend to cause the plunger 14 to continually oscillate in the chamber 7 and thus give an undulating movement to the frame 2 that tendency will be quickly arrested by reason of the dash-pot acting as a drag on the movement of the plunger and thus causing a balancing of the forces acting on the plunger and establishing complete equilibrium. When the vehicle receives a shock it is transmitted to the springs, chassis and shock absorbing element with the result that the said springs and chassis initially tend to approach each other while the plunger 12 moves upwardly in the compression chamber 7' causing the cylinder 24 to move upwardly relatively to the piston 31. The upward movement of the cylinder 24 relatively to the piston 31 compresses the air in the cylinder portion below the piston until the pressure therein is sufficient to lift the valve 42 allowing the pressure on both sides of the piston to become substantially equal and arresting the braking effect of the piston so that the resiliency of the shock absorbing elements is maintained. The reaction of the shock absorbing elements 3 and 23 to the initial movement just described will cause the piston 31 to move upwardly relatively to the cylinder 24 and the plunger 12 to move downwardly, due to the mounting of the elements, with the valve 42 remaining closed throughout the entire upward stroke of the piston. The air above the piston 31 will be gradually compressed exercising increasing pressure on the piston so that the maximum braking effect of the device 24 is produced on this movement. The opening 41 permits some reduction in the pressure on the piston so that the piston will not be suddenly arrested and thus impair the device in effectively counteracting and neutralizing shocks. The size and number of openings such as 41 is adjusted as necessary to prevent the sudden arrest of the piston. The valve 42 may be reversed if the predominant retardation is desired on the down stroke of the piston and if the same retardation is desired in both directions the valve may be omitted and the opening or openings through the piston made of such size as to give the desired retardation. However, under most conditions of use superior results are obtained with the valve arranged as shown.

It frequently happens that after the force of a severe shock has set the movable elements of the shock absorbing device 3 in motion the ripples on the surface of the highway will furnish sufficient impetus to said movable elements to sustain them in their initial movements with the result that the body of the vehicle assumes the rapid undulating movement previously described. The dash-pot 23 not only serves to check the rapid oscillating tendency which normally follows a shock but also overcomes the undulating movement of the vehicle by reason of the intensified force of its drag on the device 3 which gradually increases in intensity on the upward movement of the piston 31 of the dash-pot.

The application of the device here shown and described is not restricted to automobiles or other vehicles but the device may be used wherever there are two parts movable relatively to each other by a sudden movement which it is desired to cushion. I do not wish therefore to be limited to the specific form of the device here shown or to the specific application of it to an automobile but merely by the scope of the appended claims.

I claim:

1. A shock absorber adapted to be mounted on a vehicle comprising pneumatic means for neutralizing and counteracting the shocks received by said vehicle, and a dash-pot for assisting the pneumatic means in neutralizing the shock and providing a dampening action toward motion in either direction for quickly arresting the forces set in motion by said shock to bring them into a state of equilibrium.

2. A shock absorber adapted to be mounted between the frame and springs of a vehicle comprising a compression chamber containing a compressible fluid, a plunger adapted to oscillate in said chamber, and means acting as a drag on the plunger as regards motion in either direction but exercising its maximum retarding influence on movement of the parts in which the springs and frame of the vehicle move away from each other quickly to arrest the relative movement of said plunger and chamber.

3. A shock absorber adapted to be mounted between the frame and springs of a vehicle comprising a compression chamber containing a compressible fluid, a plunger adapted to oscilalte in said chamber, the movement of said plunger acting as a drag as regards relative movement of the plunger and chamber in either direction, the drag having its maximum retarding influence on movement of said plunger by which the springs and frame of the vehicle move away from each other quickly to arrest the relative movement of said plunger and chamber.

4. A shock absorber for a vehicle, comprising a compression chamber, a plunger rod having a head adapted to oscillate in said chamber, a relatively large coil spring surrounding the plunger rod and adapted to be compressed on the upward movement of the head, a relatively small coil spring surrounding the plunger and contained within the large coil spring, and means acting as a drag on said head and exercising its maximum retarding effect on the down stroke thereof quickly to arrest the relative movement of said head in said chamber.

5. A shock absorber adapted to be mounted on the usual frame and springs of a vehicle comprising a compression chamber containing a collapsible vessel filled with compressed air mounted on the frame of said vehicle, a plunger carried by the springs of said vehicle adapted to oscillate in said chamber and bear on said vessel, a piston rigidly attached to said compression chamber, a cylinder in which said plunger operates, said piston and cylinder quickly arresting relative movement between said compression chamber and plunger to bring them into a state of equilibrium.

6. A shock absorber adapted to be mounted on the usual frame and springs of a vehicle comprising a body portion having a compression chamber containing compressed air mounted on the frame of said vehicle, a plunger carried by the springs of said vehicle adapted to oscillate in said chamber, a piston having a piston rod attached to the body portion of said compression chamber, a cylinder attached to said plunger receiving said piston, a one way valve in said piston adapted to lift on the down stroke of said piston.

7. A shock absorber adapted to be mounted between the frame and springs of a vehicle comprising means for neutralizing and counteracting the shocks received by said vehicle, and means for assisting said first named means and for bringing said first named means into a state of equilibrium, said second named means comprising an air filled cylinder and a piston working therein, bleed openings in the piston head, and a check valve in one of said bleed openings so placed that little resistance is offered to the initial shock but a greater resistance is offered to the recoil therefrom and to successive shocks.

8. A shock absorber for a vehicle, comprising a pneumatic means and a spring means for neutralizing the shocks and means for dampening the oscillations of said first named means including a cylinder filled with a compressible fluid and a piston operating therein having bleed openings in its head.

9. A shock absorber for a vehicle, comprising a pneumatic means and a spring means for neutralizing the shocks, and means for dampening the oscillations of said first named means, said last named means assisting in the action of the first named means but offering its maximum resistance to motion in the opposite direction therefrom.

10. A shock absorber for a vehicle, comprising a pneumatic means and a spring means for neutralizing the shocks, and means of dampening the oscillations of said first named means including a cylinder filled with a compressible fluid and a piston operating therein having bleed openings in its head, a check valve on at least one of the openings in the piston head allowing flow upwardly only, whereby the movement of the piston by an initial shock in a downward direction tends to assist the pneumatic and spring means, and an upward movement, accompanied by the closing of the check valve slows up the recoil and provides for a quick return to the normal position of all the parts.

11. An apparatus for absorbing the shocks caused by the relative movement of two members comprising a compressible chamber adapted to be fixed to one of said members, a plunger rod carried by the other of said members and having a head adapted to oscillate in said chamber, a relatively large coil spring surrounding the plunger rod and adapted to be compressed on the upward movement of the head, a relatively small coil spring surrounding the plunger rod and contained within the large coil spring, and means acting as a drag on said head and exercising its maximum retarding effect on the down stroke thereof quickly to arrest the relative movement of said head in said chamber.

12. An apparatus for absorbing the shocks caused by the relative movement of two members comprising a body portion having a compression chamber containing a compressible fluid which body portion is mounted on one of said members, a plunger carried by the other of said members and adapted to oscillate in said chamber, a piston having a rod attached to the body portion of said compression chamber, a cylinder attached to said plunger receiving said piston, a one way valve in said piston adapted to lift on the down stroke of said piston.

Signed by me at Lowell, Massachusetts, this twelfth day of August, 1925.

JOHN A. STEVENS.